United States Patent [19]

Kitamura et al.

[11] 4,363,043

[45] Dec. 7, 1982

[54] CIRCUIT ARRANGEMENT FOR SKIPPING MARKED PORTIONS OF A RECORDING TAPE

[75] Inventors: Masatsugu Kitamura; Hideo Onoye; Hiroki Shimizu, all of Yokohama, Japan

[73] Assignee: Victor Company of Japan, Limited, Yokohama, Japan

[21] Appl. No.: 169,474

[22] Filed: Jul. 16, 1980

[30] Foreign Application Priority Data

Jul. 16, 1979 [JP] Japan .................................. 54-89986

[51] Int. Cl.³ ............................................. G11B 17/00
[52] U.S. Cl. ................................... 360/72.1; 360/72.2
[58] Field of Search .................... 360/72.2, 72.1, 72.3, 360/13, 14, 74.1, 74.2

[56] References Cited

U.S. PATENT DOCUMENTS 3,984,869 10/1976 Fujii et al. ...................... 360/72.1 X
4,290,090 9/1981 Yamamoto et al. ................ 360/72.1

Primary Examiner—John H. Wolff
Attorney, Agent, or Firm—Lowe, King, Price & Becker

[57] ABSTRACT

An automatic skipping control circuit includes a voltage controlled, variable frequency filter having a passband frequency variable in accordance with the voltage of a frequency control signal applied thereto. This filter is responsive to an output signal from a transducer head representative of materials recorded in a tape where a skip-mark signal is recorded in selected portions. The filter is normally tuned to the frequency of the skip mark signal when the tape is transported at normal playing speed. Upon the leading edge of a skip-mark recorded portion reaching the transducer head, the filter provides an output signal which causes the tape to be driven in the fast-forward mode, resulting in an increase in the frequency of the skip-mark signal detected by the transducer head. The frequency control signal is generated during this fast-forward mode to vary the passband frequency of the filter to correspond to the increased frequency of the detected skip-mark signal. Since the speed of the tape measured at the transducer head during the fast-forward mode varies as a function of the diameter of the convolutions of the tape wound on a takeup reel, the voltage of the frequency control signal is varied as a function of this diameter to keep track of the varying frequency of the detected skip-mark signal.

14 Claims, 4 Drawing Figures

CIRCUIT ARRANGEMENT FOR SKIPPING MARKED PORTIONS OF A RECORDING TAPE

BACKGROUND OF THE INVENTION

The present invention relates generally to tape recorders, and more particularly to an automatic skipping control circuit for tape reproducing apparatus or tape recording-reproducing apparatus and to such apparatus incorporating the automatic skipping circuit to enable the user to hear only the program he desires.

During the time when a tape recorder is operated in the playback mode the user often encounters portions which are not desired for reproduction. For example, if the recorded material has been obtained from a broadcast program, the portions of the tape where advertisements are recorded, are not desired. One approach would be to erase the undesired materials in order for a sensing circuit to sense the erased portions for driving the tape at a higher speed when the tape is replayed so that the erased part of the tape is automatically skipped. However, an erasing operation of this type would result in loss of a portion of desired material if great care is not exercised.

SUMMARY OF THE INVENTION

In accordance with the invention, a skip mark signal of a predetermined low frequency is recorded into the tape in superposition with the undesired, previously recorded so that they are marked to enable a sensing circuit to distinguish from other portions of the tape when it is replayed. The sensing circuit is normally tuned to the predetermined frequency of the skip mark signal when the tape is driven at playback speed to detect a leading edge of the marked portion. Upon detection of the leading edge of a marked portion, the sensing circuit causes a takeup reel to rotate in the fast-forward mode to move the tape at a higher speed with respect to the transducer head, resulting in a significant increase in the frequency of the detected skip mark signal. Since the tape speed measured at the transducer head varies as a function of the diameter of the convolutions of the tape on the takeup reel, the frequency of the detected mark signal varies significantly depending on the position of the detected marked portion along the length of the tape.

According to the invention, the sensing circuit comprises a voltage controlled filter having a passband frequency variable in response to a control signal applied thereto. This voltage controlled filter is normally tuned to the frequency of the skip mark signal when the tape is being transported at the playback speed. The magnitude of the control signal is varied as a function of the diameter of the convolutions of the tape wound on the takeup reel. More specifically, a set of binary data is stored in memory where the data represents the varying speed of the tape measured at the transducer head when the tape is driven in the fast-forward mode and is stored in locations addressable as a function of the varying diameter of the tape convolutions on the takeup reel which is in turn represented by the speed of rotation of the takeup reel. Upon the leading edge of a marked portion of the tape reaching the transducer head, the detected mark signal finds a low impedance path in the voltage controlled filter. The output of the filter is compared in a comparator with a reference value so that the comparator generates an output signal when the filter output is greater than the reference value. The output of the comparator is used to trigger a gate to generate an address signal to retrieve a stored datum from the memory. The control signal representing the retrieved datum is applied to the voltage controlled filter. Concurrently, the comparator output signal is delivered as a fast-forward signal to the tape drive mechanism of the tape player. As a result, the frequency of the skip mark signal detected by the transducer head increases. Since the voltage controlled filter is supplied with the frequency control signal, the passband frequency thereof is altered to pass the skip mark signal to the comparator to enable the control signal to vary its magnitude during the time the skip-marked portion of the tape is moving past the transducer head. In response to the trailing edge of the skip-marked portion reaching the transducer head the fast-forward signal is terminated and the tape speed is changed to the playback mode speed.

Preferably, upon the termination of the fast-forward signal a rewind signal is generated to rewind the tape by the length which would overrun the position of the transducer head from the point of detection of the trailing edge of the skip-mark portion. This rewind signal is generated in response to an overrun length data retrieved from a memory as a function of the speed of rotation of the takeup reel.

A muting circuit is provided to suppress the input to a loudspeaker to an inaudible level when the skip-marked portion is moving past the transducer head at the high speed.

An object of the present invention is therefore to provide an automatic skipping control circuit which generates a fast-forward control signal to cause the tape speed to vary from the playback to the fast-forward speed upon detection of a portion of a tape where a skip-mark signal is recorded and keeps track of the varying frequency of the detected skip-mark signal as a function of the varying speed of the tape.

BRIEF DESCRIPTION OF THE DRAWINGS

This and other objects, features and advantages of the invention will become apparent from the following detailed description when read in conjunction with the accompanying drawings, in which.

DETAILED DESCRIPTION

Figure 1:
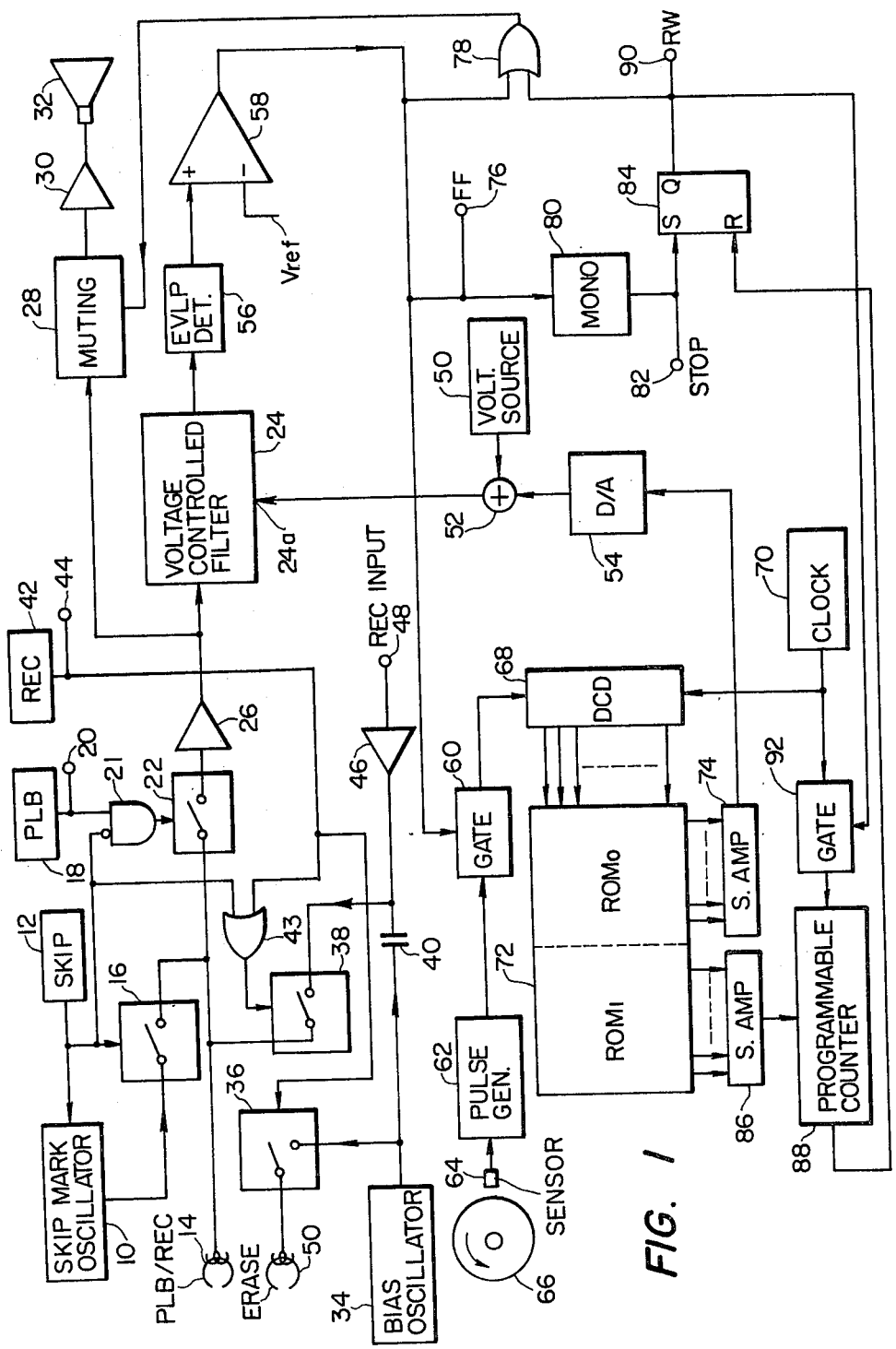
FIG. 1 is a schematic illustration of the block diagram of the tape recorder embodying the invention.

Referring now to FIG. 1, an automatic skipping control circuit of the invention for a tape recorder is schematically illustrated. The circuit includes a skip mark oscillator 10 which generates a skip mark signal of 30 Hz, for example, of a constant amplitude in response to the operation of a skip key 12. This skip mark signal is applied to the playback-recording transducer head 14 through a switch 16 when the latter is activated in response to an enable signal from the skip key 12 when the tape is driven in the playback mode. This play back mode is effected in response to the operation of a playback key 18 which supplies its signal through a terminal 20 to the tape drive mechanism of the tape recorder, not shown. The playback signal is also coupled to an AND gate 21 which is also supplied with an inverted signal from the skip key 12. The output of the AND gate 21 is coupled to a switch 22 to feed output signals from the head 14 to a voltage controlled filter 24 through an amplifier 26 and also to a muting circuit 28, through an amplifier 30 and thence to an electroacoustic transducer such as loudspeaker or earpiece 32.

A bias signal oscillator 34 provides a constant amplitude ultrasonic frequency signal to a switch 36 and also to a switch 38 via a capacitor 40. Both of switches 36 and 38 are closed in response to a recording control signal provided by a recording key 42, with the switch 38 being further responsive to a skip control signal provided by the skip key 12 via an OR gate 43 and the recording control signal provided by the recording key 42 being also coupled through a terminal 44 to the tape drive mechanism. When these switches are closed, the bias signal is applied to the recording head 14 to superimpose on the input signal to the recorder supplied through an amplifier 46 from the input terminal 48, and also applied to an erase head 50 to erase the previously recorded material.

In order for the user to detect undesired portions of the tape, the tape recorder is operated in the playback mode to reproduce the recorded signal which is passed to the speaker 32 through a circuit including the head 14, switch 22, amplifier 26, muting circuit 28 (which is not operated in this instance) and amplifier 30. When the user successively detects the leading and trailing edges of an undesired tape portion, he instantly reads off the corresponding numbers indicated on a tape counter 66 which is driven by a takeup reel. This process is repeated until all the undesired materials are searched and the corresponding tape counter numbers are read off. After doing this, the user then rewinds the tape until it returns to the starting position whereupon the tape is played back to record the skip mark signal. The skip mark signal is recorded by operating the skip key 12 which provides an inverted skip control signal to the AND gate 21 to thereby terminate its output, so that switch 22 opens to cut off the circuit for the high-level skip mark signal to the loudspeaker 32. The skip control signal from key 12 is also applied through OR gate 43 to the control gate of the switch 38 to supply the bias signal to the playback head 14. Therefore, the skip mark signal, together with the bias signal, can be recorded over the previously recorded undesired material without erasing it when the user depresses the skip key 12 as he encounters the number indicated on the tape counter 66 corresponding to the leading edge of the material to be skipped off. The user holds the skip key 12 until he encounters the next number corresponding to the trailing edge of the material.

With the 30 Hz skip mark signal so recorded in the tape, the tape is rewound and then played back again in subsequent automatic skip-controlled playback mode during which the switch 22 is closed to apply the output signal from the transducer head 14 to the voltage controlled filter 24. This filter is designed so that its passband frequency is made variable in accordance with a control voltage supplied to its control terminal 24a. Normally, the control voltage is supplied from a voltage source 50 through an adder 52 to which is also supplied an output from a digital-analog converter 54, which output signal is normally set to a zero voltage level in the absence of an input signal thereto. The voltage supplied from the source 50 is selected so that the passband frequency of the filter 24 corresponds to the frequency of the skip mark signal, i.e. 30 Hz when the playback head 14 is reproducing the programs which are desired for reproduction. Therefore, as long as the filter 24 is tuned to 30 Hz, the reproduced signal undergoes a substantial attenuation as it passes through the filter 24, so that the output of an envelope detector 56 remains at a level lower than a reference voltage $V_{ref}$ of the inverting input of a comparator 58, thus resulting in a low comparator output. During this interval the muting circuit 28 is supplied with a low voltage control signal from the OR gate 78 to all the reproduced signal to pass the loudspeaker 32.

When the skip mark signal recorded portion is reproduced, this signal finds a low impedance path through the voltage controlled filter 24 which is still tuned to 30 Hz, so that the output of the envelope detector 56 goes high and as a result the comparator 58 is switched to a high output state. The high level output of the comparator 58 is used to enable a gate circuit 60 to pass an input signal applied thereto. The input signal to the gate 60 is derived from a sensor 64 of electromagnetic or photoelectrical type which is mounted with respect to the periphery of a toothed wheel, not shown, of the tape counter 66 to generate pulsating voltages which are sharply defined in binary level by a pulse generator or waveshaping circuit 62. The frequency of the output pulse from the pulse generator 62 is proportional to the speed of rotation of the tape counter 66 and hence the takeup reel. Therefore, the interval between successive ones of the output pulses from the pulse generator 62 is representative of the varying diameter of the convolutions of tape wound on the takeup reel which in turn represents the location of reproduced signal, as will be understood later.

The output of the pulse generator 62 is passed through the gate 60 in response to the high level comparator output to the reset input of a decoder or a counter 68 to which is also connected a clock source 70. The decoder 68 provides an output which is a binary representation of the number of clock pulses which occur during an interval between successive reset pulses supplied thereto. Therefore, the output of the decoder 68 is representative of the speed of rotation of the takeup reel and hence the location of the leading edge of the skip-marked portion of the tape with respect to a tape end. The decoder 68 output is coupled as an address signal to a read-only memory 72 which comprises two units $ROM_0$ and $ROM_1$ in which sets of data are respectively stored in advance.

The output of the comparator 58 is also applied to a terminal 76 and thence to the tape drive mechanism to switch the tape operation from the playback mode to the fast-forward mode. Concurrently, the muting circuit 28 is supplied with a high level control signal from the comparator via an OR gate 78 to suppress the level of input signals to the loudspeaker 32 to an inaudible level. Therefore, the tape speed is automatically switched to a high speed value as the leading edge of a skip-marked portion is encountered at the playback head 14. When the tape speed is increased the frequency of the skip mark signal supplied to the variable frequency filter 24 increases accordingly, so that it is necessary that the control voltage supplied to the filter 24 must be controlled to match its passband frequency to the increased frequency of the skip mark signal. Since the tape speed during the fast-forward mode varies from point to point along the length of the tape as a function of the varying diameter of tape convolutions on the takeup reel, the control voltage for the filter 24 must be correlated to the instantaneous value of the diameter of the tape convolutions. This correlation is accomplished by the data retrieved from the $ROM_0$ in response to the binary output of the decoder 68.

Figure 2:
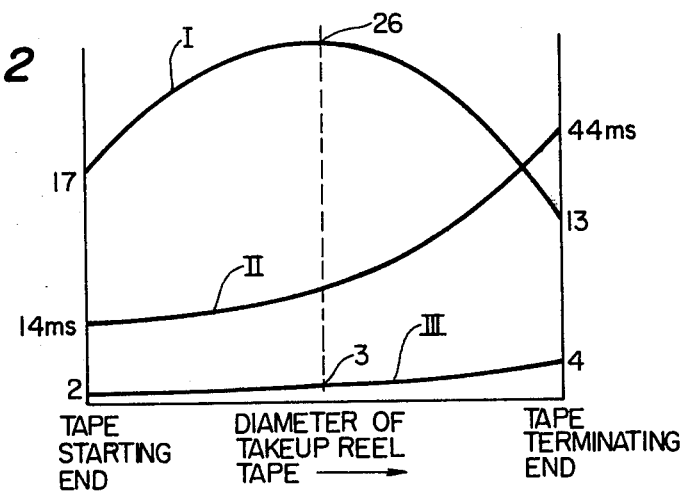
FIG. 2 is a graphic illustration of the tape operating factors as a function of the varying diameter of the convolutions of the tape wound on a takeup reel.

For a better understanding of the present invention reference is made to FIG. 2. During the fast-forward mode, the speed of the tape measured at the transducer head 14 varies significantly as a function of the diameter of the tape convolutions as indicated by curve I, which is in contrast with the constant tape transport speed during the recording or playback mode. As illustrated in FIG. 2, the fast-forward mode speed is 17 times as high as the playback speed when the convolution diameter on the takeup reel is at a minimum, reaches a maximum speed 26 times higher than the playback speed, and finally reaches a minimum speed which is 13 times the speed of the playback mode when the convolutions have a maximum diameter. Curve II is an illustration of the interval between pulses generated by the pulse generator 62 and hence the speed of revolution of the takeup reel, as a function of the diameter of the tape convolutions on the takeup reel. Since the binary output of the decoder 68 is representative of the pulse interval, it is seen that the varying diameter of the tape convolutions can be correlated to the varying speed of the tape at the playback head 14 by a function describing the relationship between them.

The data stored in the $ROM_0$ is a binary representation of the function describing the relationship between the speed of revolution of the takeup reel (measured in terms of the interval between pulse generator 62 outputs) and the varying speed of the tape at the transducer head 14. Each of the stored data is retrieved from the $ROM_0$ in response to an address data provided by the decoder 68 and delivered through a sense amplifier 74 to the digital-analog converter 54. More specifically, the data stored in the $ROM_0$ correspond to $(k-1)$ V, where "k" is a variable according to the curve I and "V" is the voltage supplied from the voltage source 50. The voltage at the output of the adder 52 is thus equal to kV which regulates the passband frequency of the filter 24 so as to offer low impedance to the reproduced skip mark signal whose frequency has just increased to a level "k" times higher than the playback speed in response to the tape recorder being switched to the fast-forward mode.

The output of the envelope detector 56 and therefore the output of the comparator 58 remains at the high voltage level. This condition continues until the time when the playback head 14 encounters the trailing edge of the marked portion of the tape, whereupon the output of the comparator 58 drops to the low level. The trailing edge transition of the high level output of comparator 58 is detected by a negative edge triggered monostable multivibrator 80 which provides a stop signal to a terminal 82 and thence to the tape drive mechanism to apply a brake to the takeup reel. The output of the monostable multivibrator 80 is coupled to the set input of a flip-flop 84. Since the tape wound on the takeup reel has a tendency to overrun from the point of detection of the trailing edge of the skipped area due to its inertia, the tape is preferably rewound by the overrun length subsequent to to the stop signal to permit the subsequent playback mode to initiate at the leading edge of a desired program.

In the $ROM_1$ is stored a set of overrun data which represents the length of overrun as a function of the diameter of tape convolutions on the takeup reel, as illustrated by curve III, FIG. 2. The data stored in the $ROM_1$ is also retrieved in response to the binary output of the decoder 68, the retrieved data being delivered through a sense amplifier 86 to a programmable counter 88 so that its preset count value is adjusted to the retrieved overrun length.

The flip-flop 84, which has received a set input from the monostable multivibrator 80, provides a high Q output to a terminal 90 to cause the tape recorder to operate in the rewind mode. The high Q output is also coupled to a gate 92 to drive the counter 88 with the clock pulse from the source 70. When the counter 88 is filled with a count corresponding to the preset value, the flip-flop 84 is reset, whereby the tape is rewound for a time interval corresponding to the retrieved overrun length data.

The rewind signal from the Q output of the flip-flop 84 is also applied to the muting circuit 28 through the OR gate 78.

Figure 3:
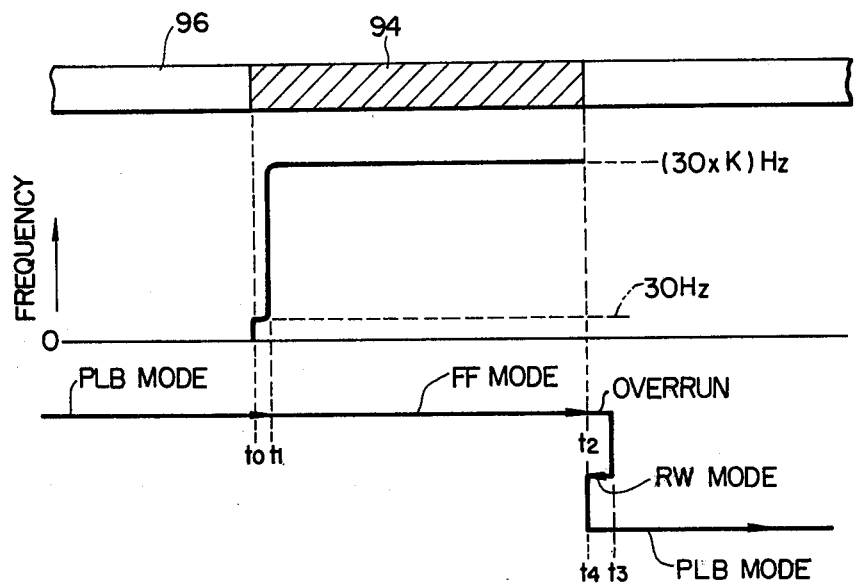
FIG. 3 is an illustration of a timing diagram.

The above-described sequence of operations is summarized in FIG. 3. The mark signal recorded portion is indicated by a hatched area 94 on a tape 96 which is driven in the playback mode until time $t_1$ after time $t_0$ which corresponds exactly to the leading edge of the marked portion 94. This leading edge is detected by the variable frequency filter 24 when its frequency is tuned to the 30 Hz during the time interval $t_0$ and $t_1$. Subsequent to time $t_1$ the passband frequency of the filter 24 is shifted to $(30 \times k)$ Hz until the trailing edge of the portion 94 is detected at time $t_2$ as the tape is driven in the fast-forward mode. The tape is shown to overrun until time $t_3$ whereupon it is rewound until time $t_4$. Subsequent to time $t_4$ the playback mode is resumed automatically when the rewind command signal at terminal 90 terminates.

It is appreciated that the above process will be repeated whenever a skip-mark indicated portion is encountered during the normal playback mode.

Figure 4:
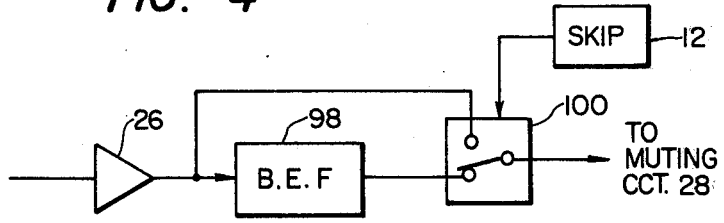
FIG. 4 is an illustration of a modification of the invention.

From the above discussion it will be seen that during the interval between times $t_0$ and $t_1$ the 30 Hz skip mark signal is fed through the muting circuit 28 to the loudspeaker 32 and the user hears the unwanted low frequency signal. Preferably, a band elimination filter 98 is provided as illustrated in FIG. 4. This filter is connected between the output of the amplifier 26 and the input of the muting circuit 28 via a normally closed contact of a switch 100 and is disconnected in response to a control signal from the skip key 12 being applied to the switch 100 to apply the output of the amplifier 26 to the muting circuit 28 when the skip mark signal is being recorded into the tape.

What is claimed is:

1. An automatic skipping control circuit for a tape reproducing apparatus having means for driving a tape in playback, fast-forward or rewind mode in response to a speed control signal, a transducer head, and means for reproducing materials recorded in said tape when said tape is driven in said playback or fast-forward mode by contacting said tape with said transducer head, wherein selected portions of said tape are recorded with a skip mark signal of a predetermined frequency, comprising:

voltage controlled filter means having a passband of which the frequency is variable in accordance with a frequency control signal applied thereto, the passband frequency of the filter means normally corresponding to said predetermined frequency of the skip mark signal when the tape is driven in said playback mode, said filter means being responsive to an output signal from said transducer head for generating a fast-forward speed control signal to cause said tape to be driven in said fast-forward mode, whereby the frequency of the skip mark signal detected by said transducer head becomes higher than said predetermined frequency; and means for generating a said frequency control signal in response to the occurrence of said fast-forward speed control signal, the magnitude of said frequency control signal being a function of a varying diameter of the convolutions of said tape wound on a takeup reel of said tape reproducing apparatus, whereby the passband frequency of said voltage controlled filter means is varied to correspond to the increased frequency of the detected skip mark signal.

2. An automatic skipping control circuit as claimed in claim 1, wherein said control signal generating means comprises:

storage means for storing therein a set of data representing a function describing the relationship between the speed of said tape measured at said transducer head when said tape is driven in said fast-forward mode and the speed of rotation of said takeup reel during said fast-forward mode; and means for generating an address signal representing said speed of rotation of said takeup reel to retrieve a stored datum from said storage means.

3. An automatic skipping control circuit as claimed in claim 2, wherein said address signal generating means comprises:

means for generating pulses at a frequency variable as a function of the speed of rotation of said takeup reel during said fast-forward mode; and means responsive in the presence of said fast-forward control signal for counting clock pulses from a clock source which occur during the interval between successive ones of said speed representative pulses to generate a binary output representing said address signal.

4. An automatic skipping control circuit as claimed in claim 2, further comprising:

second storage means for storing therein a set of overrun data representing a function describing the relationship between the length of tape which overruns from the point of the termination of said fast-forward control signal and the speed of revolution of said takeup reel, said second storage means being addressable in response to said address signal; and means for generating a rewind control signal for rewinding said tape in response to the termination of said fast-forward control signal for an interval related to the addressed datum.

5. An automatic skipping control circuit as claimed in claim 1, further comprising:

means for causing said tape to rewind in response to the termination of said fast-forward control signal for an interval depending on the diameter of said tape convolutions.

6. An automatic skipping control circuit as claimed in claim 5, wherein said means for causing said tape to rewind comprises:

storage means for storing therein a set of overrun data representing a function describing the relationship between the length of tape which overruns from the point of the termination of said fast-forward control signal and the speed of revolution of said takeup reel during said fast-forward mode;

means for generating an address signal representing the speed of revolution of said takeup reel to retrieve a stored datum from said storage means in the presence of the comparator output signal; and means for generating a rewind control signal for rewinding said tape at the termination of said fast-forward control signal for an interval related to said retrieved datum.

7. A tape playing apparatus having a transducer head, means for driving a tape wound on a reel at a playing speed for reproduction of materials recorded in said tape, and means for rotating said reel at higher speeds than said playing speed with a portion of said tape contacting with said transducer head, the speed of said head contacting portion of the tape being variable as a function of the diameter of the convolutions of the tape on said reel, comprising:

an oscillator for generating a skip mark signal at a predetermined frequency;

means for applying said skip mark signal to said transducer head when said tape is driven at said playing speed to record said applied signal in selected portions of the tape;

voltage controlled filter means having a passband of which the frequency is variable in accordance with a frequency control signal applied thereto, the passband frequency of the filter means normally corresponding to said predetermined frequency of the skip mark signal when the tape is driven in said playback mode, said filter means being responsive to an output signal from said transducer head for generating a fast-forward speed control signal to cause said tape to be driven in said fast-forward mode, whereby the frequency of the skip mark signal detected by said transducer head becomes higher than said predetermined frequency; and means for generating a said frequency control signal in response to the occurrence of said fast-forward speed control signal, the magnitude of said frequency control signal being a function of a varying diameter of the tape convolutions, whereby the passband frequency of said voltage controlled filter means is varied to correspond to the frequency of the detected skip mark signal.

8. A tape playing apparatus as claimed in claim 7, wherein said frequency control signal generating means comprises:

storage means for storing therein a set of data representing the speed of the tape measured at said transducer head when said tape is driven at said higher speeds as a function of the speed of revolution of said reel when rotated at said high speeds; and means for generating an address representing said speed of revolution of said reel to retrieve a stored datum from said storage means.

9. A tape playing apparatus as claimed in claim 8, wherein said address signal generating means comprises:

means for generating pulses at a frequency variable as a function of the speed of revolution of said reel when rotated at said higher speeds; and means responsive in the presence of said comparator output signal for counting clock pulses from a clock source which occur during the interval between successive ones of said speed representative pulses to generate a binary output representing said address signal.

10. A tape playing apparatus as claimed in claim 8, further comprising:
second storage means for storing therein a set of overrun length data representing a function describing the relationship between the length of tape which overruns from the point of the termination of said fast-forward control signal and the speed of revolution of said reel, said second storage means being addressable in response to said address signal; and
means for generating a rewind control signal for rewinding said tape in response to the termination of said fast-forward control signal for an interval related to the addressed datum.

11. A tape playing apparatus as claimed in claim 7, further comprising means for reversing the direction of movement of said tape when driven at said higher speeds in response to the termination of said fast-forward control signal and driving said tape in said reversed direction for an interval depending upon the diameter of said tape convolutions.

12. A tape playing apparatus as claimed in claim 11, wherein said reversing means comprises:
storage means for storing therein a set of overrun length data representing a function describing the relationship between the length of tape which overruns from the point of the termination of said fast-forward control signal and the speed of revolution of said reel when rotated at said higher speeds;
means for generating an address signal representing the speed of revolution of said reel to retrieve a stored datum from said storage means in the presence of said fast-forward control signal; and
means for generating a rewind control signal for rewinding said tape at said higher speeds at the termination of said fast-forward control signal for an interval related to said retrieved datum.

13. A tape playing apparatus as claimed in claim 7, further comprising means for suppressing the level of said output signal from said transducer head which is applied to electroacoustic transducer means to an inaudible level when said tape is driven at said higher speeds.

14. A tape playing apparatus as claimed in claim 7, further comprising:
second filter means for eliminating the skip mark signal detected by said transducer head when said tape is driven at said playing speed; and
means for disabling said second filter means when said skip mark signal is being applied to said transducer head.

* * * * *